United States Patent
Sjöö

(10) Patent No.: US 8,926,232 B2
(45) Date of Patent: Jan. 6, 2015

(54) MILLING TOOL AS WELL AS SEGMENT THEREFOR

(75) Inventor: Sture Sjöö, Gävle (SE)

(73) Assignee: Sandvik Intellectual Property AB, Sandviken (SE)

( * ) Notice: Subject to any disclaimer, the term of this patent is extended or adjusted under 35 U.S.C. 154(b) by 419 days.

(21) Appl. No.: 13/524,072

(22) Filed: Jun. 15, 2012

(65) Prior Publication Data

US 2012/0321397 A1    Dec. 20, 2012

(30) Foreign Application Priority Data

Jun. 20, 2011 (SE) .................................. 1150558

(51) Int. Cl.
| | | |
|---|---|---|
| B23F 5/22 | (2006.01) | |
| B23C 5/04 | (2006.01) | |
| B23C 5/00 | (2006.01) | |
| B23F 21/16 | (2006.01) | |
| B23F 21/14 | (2006.01) | |

(52) U.S. Cl.
CPC . *B23C 5/04* (2013.01); *B23C 5/006* (2013.01); *B23F 21/166* (2013.01); *B23C 2210/244* (2013.01)
USPC .............................. 407/23; 407/31

(58) Field of Classification Search
CPC ........ B23F 21/14; B23F 21/16; B23F 21/146; B23F 21/163; B23C 2210/244
USPC ............ 407/23, 25, 28, 29, 30, 31, 33, 42, 67
See application file for complete search history.

(56) References Cited

U.S. PATENT DOCUMENTS 1,765,853 A * 6/1930 Simmons ...................... 407/23
4,218,159 A * 8/1980 Langen ............................ 407/25
6,799,358 B2 * 10/2004 Satran .......................... 29/426.1
8,672,589 B2 * 3/2014 Kretschmer .................... 407/23

FOREIGN PATENT DOCUMENTS

| DE | 10 2005 029 053 | 1/2007 |
| DE | 10 2008 015 582 | 9/2009 |
| EP | 0 294 348 | 12/1988 |
| EP | 0 742 065 | 11/1996 |

OTHER PUBLICATIONS

European Search Report for Application No. 12171652.6 dated Oct. 9, 2012.

* cited by examiner

*Primary Examiner* — Will Fridie, Jr.
(74) *Attorney, Agent, or Firm* — Morgan, Lewis & Bockius LLP

(57) ABSTRACT

Milling tool formed for hobbing of workpieces having cogs has a cylindrical tool body defining a rotation axis and a plurality of disc-shaped segments. Each segment includes a hub part having two opposite plane-parallel end surfaces extending perpendicular to the rotation axis, and a peripheral cam having a plurality of tangentially spaced-apart milling inserts. Bordering segments are detachably interconnected by male and female members co-operating in pairs and situated with the rotation axis extending through the members, each of which include a contact surface converging from a big end toward a small end and, in a cross-section across the rotation axis, form an out-of-round curve. Contact surfaces are dimensioned so that, when members are brought together, they direct their two bordering segments toward an end position centered and mutually angularly determined by the out-of-round cross-section curve and where plane-parallel end surfaces abut against each other. An individual segment is disclosed.

22 Claims, 13 Drawing Sheets

MILLING TOOL AS WELL AS SEGMENT THEREFOR

RELATED APPLICATION DATA

This application is based on and claims priority under 37 U.S.C. §119 to Swedish Application No. 1150558-3, filed Jun. 20, 2011, the entire contents of which are incorporated herein by reference.

FIELD OF THE DISCLOSURE

The present disclosure relates to, in a first aspect, a milling tool formed for the hobbing of a workpiece having cogs, such as cogwheels, racks and the like, comprising a cylindrical tool body that defines a rotation axis and comprises a plurality of disc-shaped segments, and in an additional aspect, an individual segment for the tool.

BACKGROUND

In the discussion that follows, reference is made to certain structures and/or methods. However, the following references should not be construed as an admission that these structures and/or methods constitute prior art. Applicant expressly reserves the right to demonstrate that such structures and/or methods do not qualify as prior art against the present invention.

Milling tools for hobbing are often provided as integral tools wherein the milling inserts are placed along a helical line along a cylindrical tool body. In the manufacture of such tools, there may occasionally be problems of gaining access to machine seats for the milling inserts or the milling inserts themselves in those cases they are integrated in the tool body. This depends on the fact that it occasionally is narrow between axially consecutive revolutions of the helical line of milling inserts. This is a reason for milling tools for hobbing also being provided in the form of tools wherein the cylindrical tool body is composed of a plurality of disc-shaped segments, each segment usually embracing one turn of milling inserts in the helical line.

A plurality of different such embodiments of segment hobs are previously known. In DE 10 2005 029053 A1, a segment hob is disclosed that comprises a cylindrical tool body, which is composed of a plurality of separate segments. The separate segments are rotationally secured in relation to each other by means of loose, separate fitting bolts. In each end, there is an end piece, and the entire package of segments and end pieces is kept together by long, through screws.

A problem of this previously known segment hob is that the machining precision of the generated surfaces in the workpiece does not become sufficiently high for certain applications. Furthermore, it is occasionally a problem to mount the separate segments on a common shaft or mandrel and occasionally intricate adjusting grindings are required. In such cases, it is particularly cumbersome if the tool, e.g., after an occurred damage to some individual segment, needs to be dismounted and again be put together with a new, undamaged segment.

SUMMARY

The object of the presently disclosed milling tool is to entirely or partly obviate at least some of the above-mentioned disadvantages of the described, previously known milling tool of the type in question and to provide an improved tool. This object can be achieved by means of a tool and a segment of the type that is disclosed herein An exemplary embodiment of a milling tool, which is formed for the hobbing of a workpiece having cogs, such as cogwheels, racks and the like, comprises a cylindrical tool body that defines a rotation axis and comprises a plurality of disc-shaped segments. Each one of the segments includes a hub part having two opposite plane-parallel end surfaces, which extend perpendicular to the rotation axis, and a peripheral cam for a plurality of tangentially spaced-apart milling inserts. Bordering segments are detachably interconnected by means of one each of male and female members co-operating in pairs. The male and female members are situated so that the rotation axis extends through the male and female members. The male and female members include each a contact surface, which converges from a big end toward a small end and which, in a cross-section across the rotation axis, forms an out-of-round curve. The contact surfaces of the male and female members are dimensioned so that they, when the male and female members are being brought together, direct their two bordering segments toward a mutually angularly determined end position centred on the rotation axis, which end position is determined by the out-of-round cross-section curve and in which end position the plane-parallel end surfaces abut against each other.

The above mentioned object can be achieved by a tool that can be composed of segments with great manufacture precision while guaranteeing dependable positioning reliability as well as good repeatability in repeated mounting/dismounting. Thanks to the segments being interconnected in pairs by means of only one co-operating male and female member each, the problems of complicated and inexact fit because of the numerous fitting bolts and the through screws of the known technique are avoided. The advantageous solution of only one co-operating male and female member is facilitated by the design and the placement of the male and female members.

According to the disclosed milling tool, the male and female members are provided with respective conically converging contact surfaces, which in a cross-section form an out-of-round curve. Furthermore, the dimensions of the male and female members are accurately tuned to each other. This means that, when a male member is being mated with a female member, there is initially a radial gap between the contact surface of the male member and female member by virtue of the conicity and mutual dimensions of the contact surfaces. When the male and female members have been brought together a partial distance, the contact surfaces will contact each other, the contact usually being in point form, line form, or in subareas of the contact surfaces. Upon continued bringing together, at least fractions of the contact surfaces slide against each other. In doing so, the segments are brought to rotate toward a position angularly determined by the out-of-round cross-section. Thus, the rotationally securing lock members of the known technique situated radially outside the core are made superfluous. Thanks to the male and female members being placed around the rotation axis of the tool body, they have in addition the ability to direct the segments radially to a position in which they are mutually centred on the rotation axis. The male and female members are brought together into an axial end position that is determined by plane-parallel end surfaces at the hub part of the bordering segments meeting each other. Also in this end position, usually only fractions of the contact surfaces have contact with each other.

Thus, by means of the male and female members formed and placed as disclosed herein in combination with the plane-parallel end surfaces, a very exact mutual placement of the bordering segments is advantageously provided in all directions, viz. in angular direction, radial direction and axial direction. In other words, an utmost exact spatial positioning of the milling inserts included in the tool is provided. This entails a very high positioning reliability, which contributes to high dimensional accuracy of the tool. In such a way, good machining results in the form of smooth and dimensionally accurate flank surfaces of those cogs that are provided between the gashes cut out by the milling inserts are guaranteed. Furthermore, a simple mounting and dismounting is also advantageously obtained thanks to only one co-operating male and female member per pair of segments being needed. In addition, the construction of a standardized design and production procedure of tools of the type in question are enabled.

According to one embodiment, the male and female members are integrated with their segments. The concept "integrated", such this is used in the present application, should be interpreted in a wide sense. In a standard embodiment, the individual segment may be manufactured by the machining of a single solid workpiece, e.g., of steel. However, it is also feasible to initially permanently unite two (or more) components of the same or different materials and make the final, shape-determining machining not until in a concluding step. The integration of the connection means in the proper segments gives good possibilities to make the same with high precision and dimensional accuracy.

An exemplary embodiment of a milling tool formed for the hobbing of a workpiece having cogs comprises a cylindrical tool body that defines a rotation axis (C1, C3) and comprises a plurality of disc-shaped segments each one of which includes a hub part having two opposite plane-parallel end surfaces that extend perpendicular to the rotation axis (C1, C3), and a peripheral cam for a plurality of tangentially spaced-apart milling inserts, wherein bordering disc-shaped segments are detachably interconnected by means of one each of male and female members co-operating in pairs, wherein the male and female members are situated so that the rotation axis (C1, C3) extends through the male and female members, and wherein the male and female members include each a contact surface, which converges from a big end toward a small end and which, in a cross-section across the rotation axis, forms an out-of-round curve, the contact surfaces of the male and female members being dimensioned so that they, when the male and female members are being brought together, direct their two bordering segments toward an end position that is centred and mutually angularly determined by the out-of-round cross-section curve around the rotation axis (C1, C3) and where the plane-parallel end surfaces abut against each other.

An exemplary embodiment of segment for a cylindrical tool body for a milling tool formed for the hobbing of a workpiece having cogs, which tool body comprises a plurality of detachably interconnected such segments, is disc-shaped and comprises a hub part having two opposite plane-parallel end surfaces that extend perpendicular to a rotation axis (C3), and a peripheral cam for a plurality of tangentially spaced-apart milling inserts, wherein the segment furthermore comprises a male or female member for the detachable interconnection with a bordering segment, wherein the male or female member is situated so that the rotation axis (C3) extends through the male or female member, and wherein the male or female member includes a contact surface, which converges from a big end toward a small end and which, in a cross-section across the rotation axis, forms an out-of-round curve.

BRIEF DESCRIPTION OF THE DRAWING

The following detailed description of preferred embodiments can be read in connection with the accompanying drawings in which like numerals designate like elements and in which.

DETAILED DESCRIPTION

Figure 1:
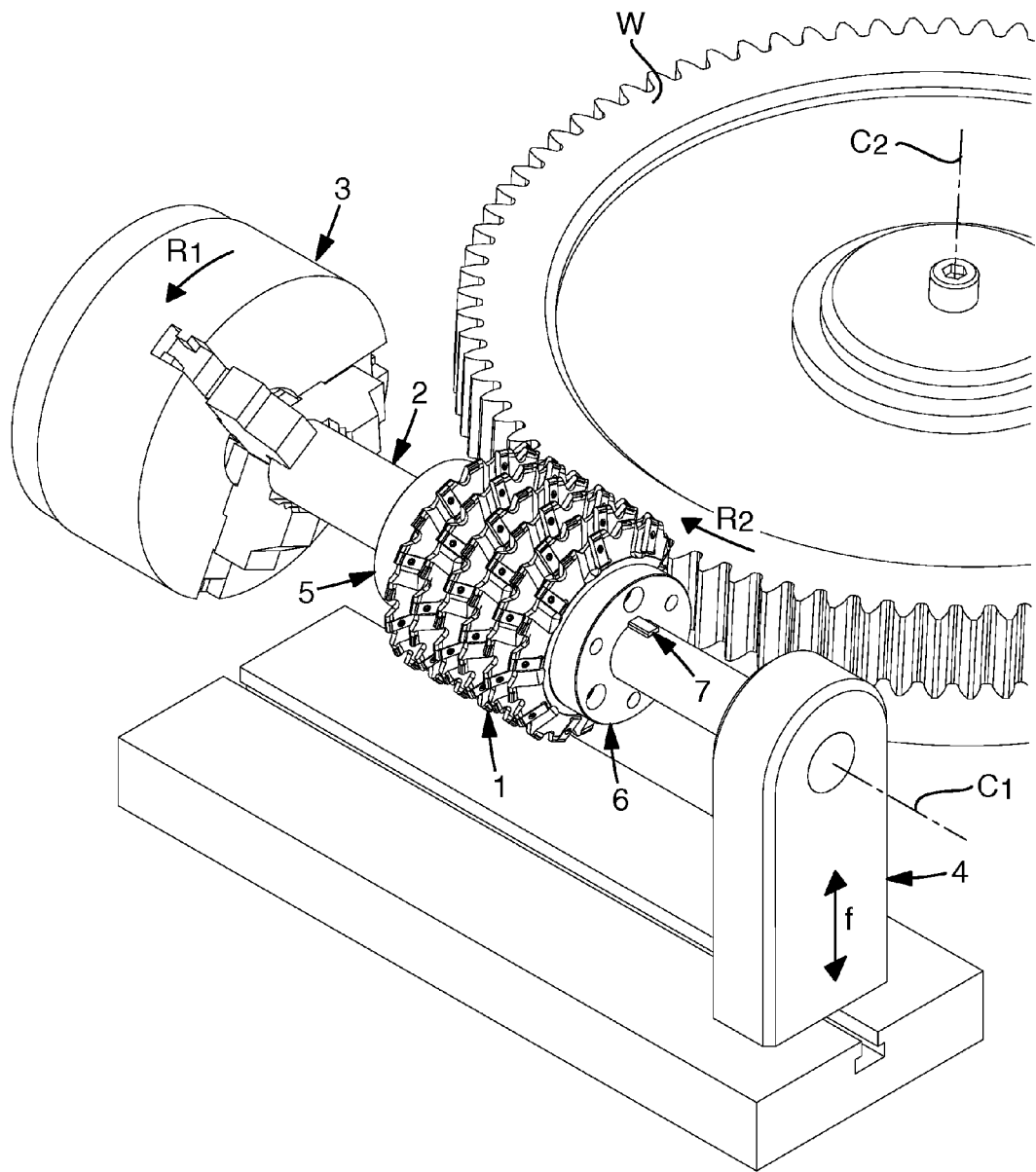
FIG. 1 is a perspective view that schematically illustrates an embodiment of the disclosed milling tool as well as a drive mechanism during milling of a cogwheel.

In FIG. 1, there is schematically illustrated an exemplary embodiment of a milling tool 1 during machining of a workpiece W with the purpose of forming a cogwheel (for the sake of clarity, the cogs and the cut-out gashes are shown in a finish-machined state). In other words, the embodiment is exemplified in the form of a segment hob. In the example, the tool 1 is mounted on a shaft 2, the centre axis of which is designated C1 and one end of which is clamped in a chuck 3, while the opposite end is journaled in a bearing bracket 4. The segments, which together form the milling tool 1, are placed between a pair of end pieces, a first one of which is designated 5 and the other one 6. For the transfer of torque from the drive shaft 2 to the tool 1, a wedge 7 is countersunk in a groove on the drive shaft and is in engagement with internal grooves in the different segments. The chuck 3 and thereby the tool 1 are rotatable in the direction R1 at the same time as the workpiece W is turnable or rotatable in the direction R2, more precisely around a centre axis C2. In practice, the milling tool is driven at a considerably higher speed than the workpiece. For instance, the tool may be rotated 100 revolutions, while the workpiece is turned 1 revolution. The feeding of the tool is made parallel to the centre axis C2, as outlined by means of the double arrow "f". By the selected directions of rotation R1, R2, the feeding takes place in the downward direction from an upper end position. The different segments, which are included in the tool, together form a cylindrical milling or basic body, the individual milling inserts included in the segments following a continuous helical line along the outside of the cylinder.

Figure 2:
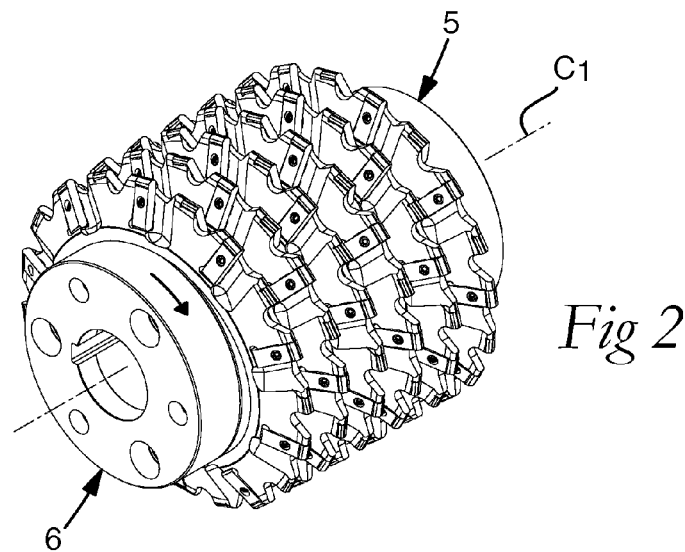
FIG. 2 is a perspective view showing an embodiment of the tool in an assembled state.
Figure 3:
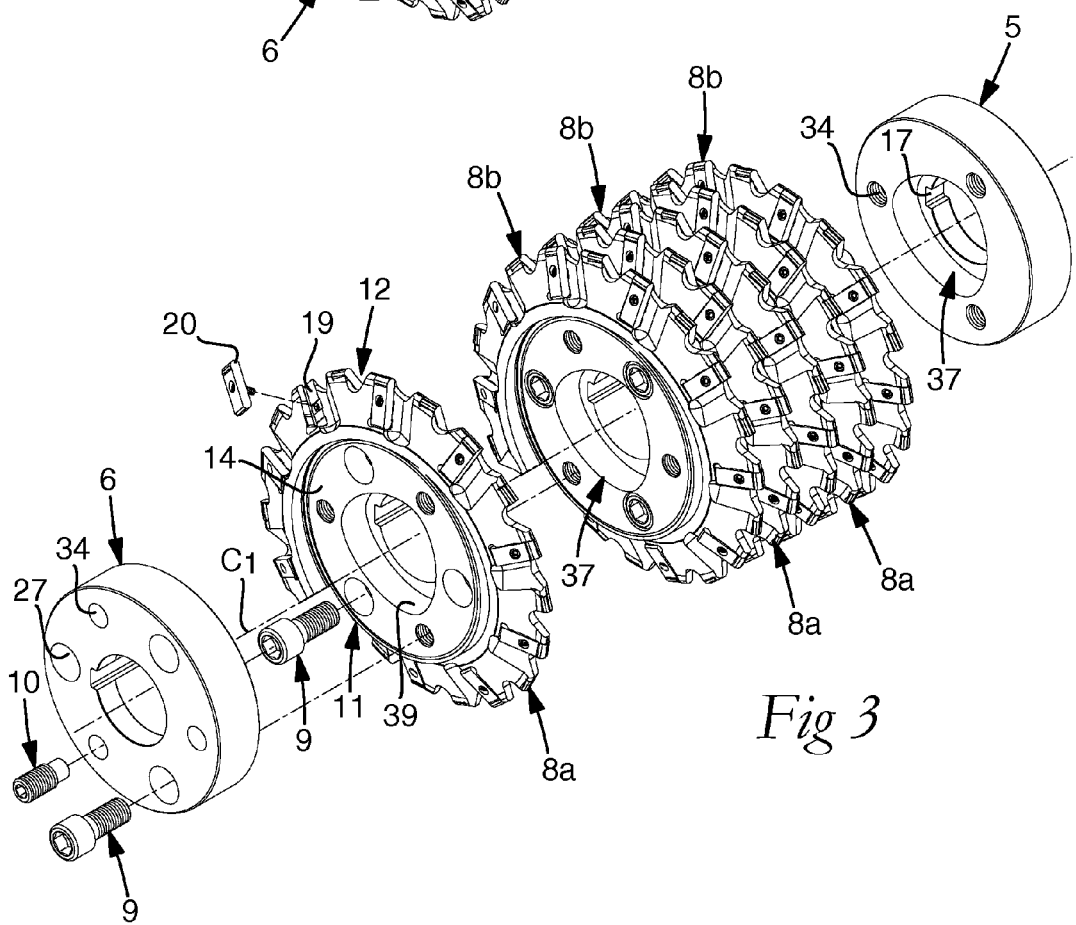
FIG. 3 is a perspective exploded view of an embodiment of the disclosed milling tool showing a segment spaced-apart from other segments of the tool as well as front and rear end pieces between which the segments are placed.

In FIGS. 2 and 3, the nature of the tool is shown more in detail. In the example, the tool is composed of six segments in total, which generally are designated 8. Every second segment of the shown set is formed in a way that differs from the intermediate segments. In order to separate the different segments hereinafter, the same have been supplemented with the suffixes "a" and "b", respectively. Of the two end pieces 5, 6, the end piece 5 farthest from the observer in FIGS. 2 and 3 is designated as a "rear" end piece, while the other forms a "front" end piece 6. In the exploded view according to FIG. 3, there are further shown two types of screws, viz. a draw-in bolt 9 and a dismounting screw 10. The purpose of these screws is described in more detail below.

Figure 4:
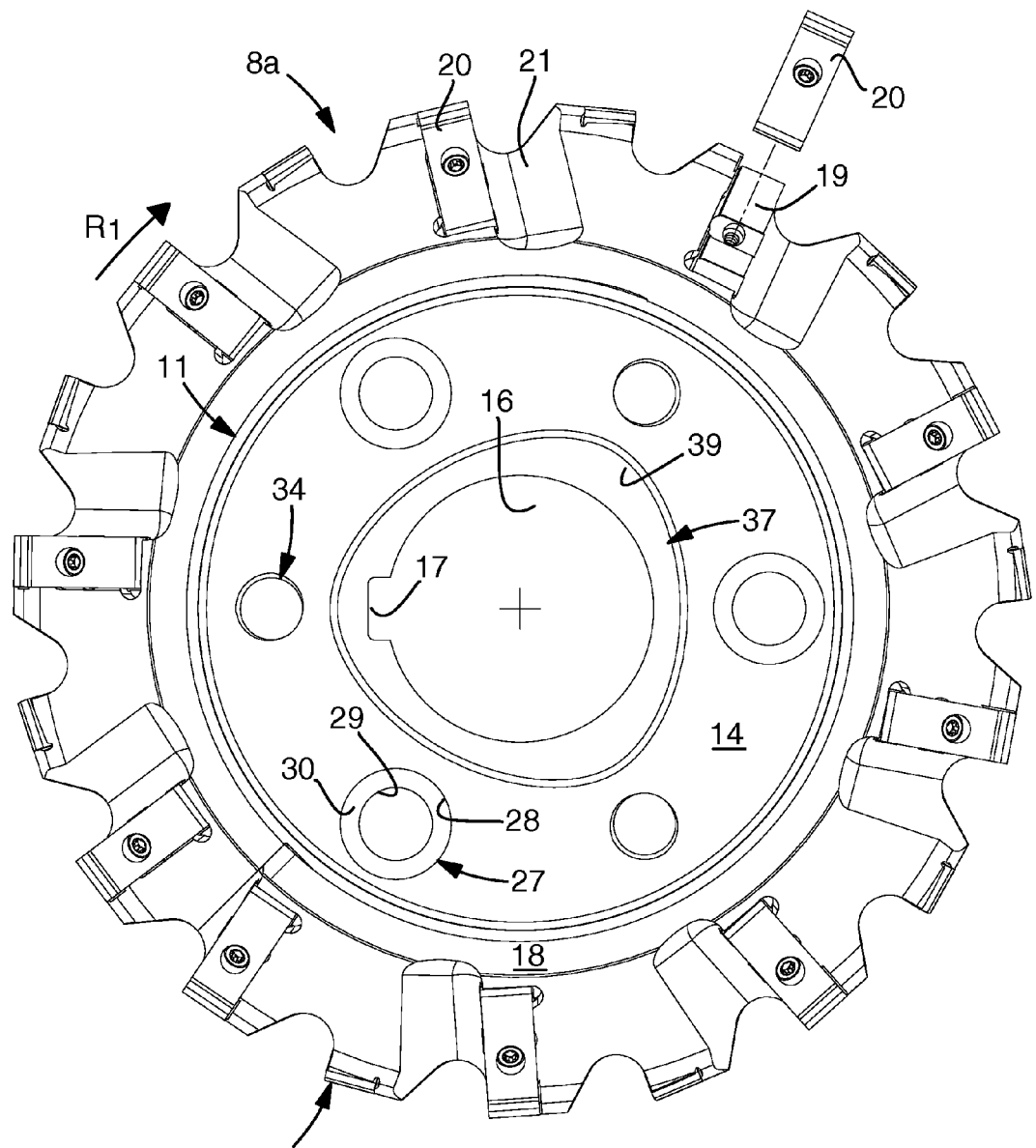
FIG. 4 is a planar view of a first type of segment included in an embodiment of the tool, more precisely as viewed from the front.
Figure 5:
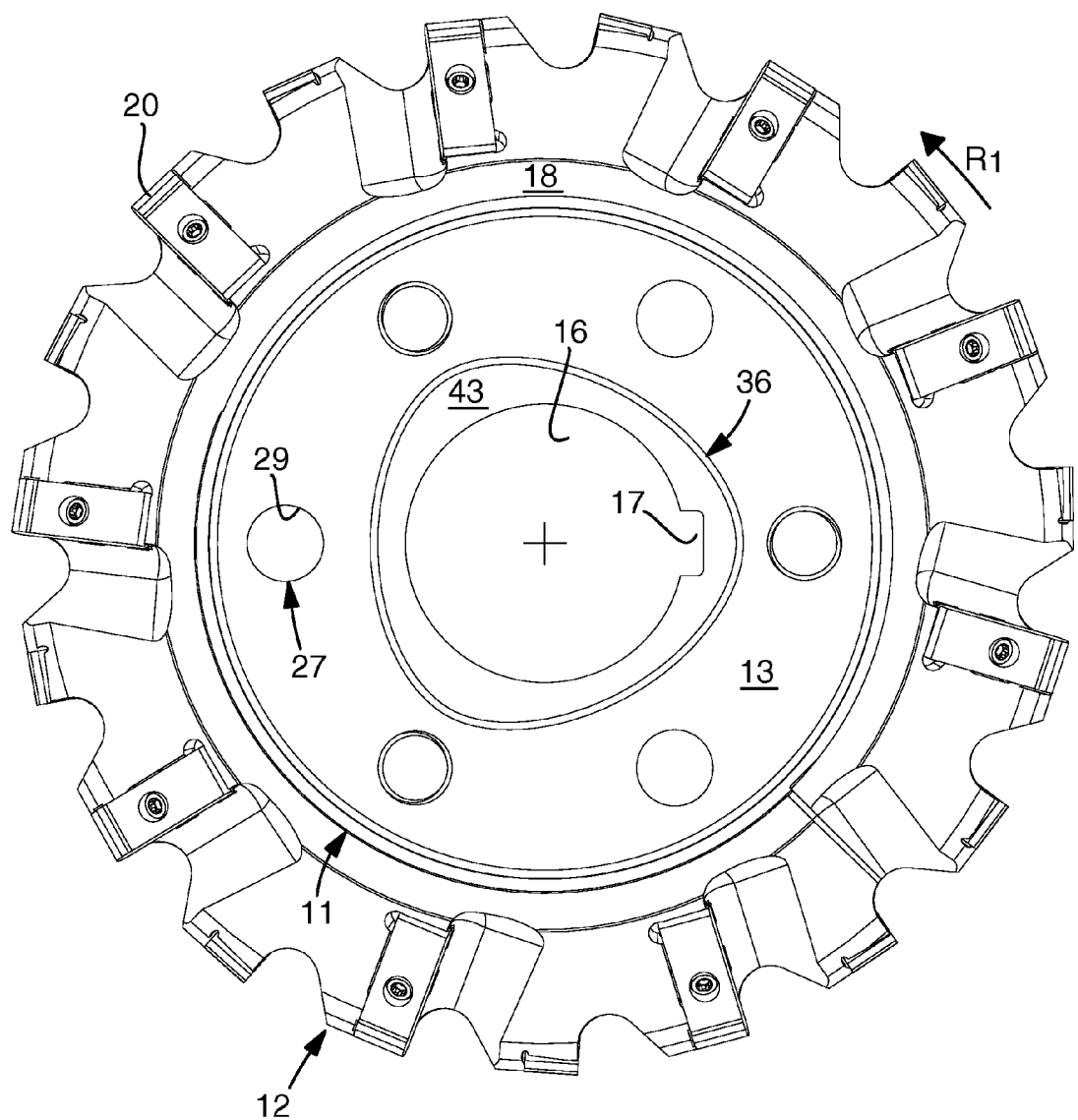
FIG. 5 is an analogous planar view of the same segment as viewed from behind.

In FIG. 4, there is shown an individual segment of the type that is designated 8a in FIG. 3. Each segment includes a hub part 11 (see also FIG. 7) and an outer, peripheral cam 12. The hub part 11 includes two plane and parallel end surfaces 13, 14 (see FIGS. 4 and 5), the first-mentioned one of which forms a rear end surface and the last-mentioned one a front end surface. Exteriorly, the hub part 11 is limited by a partially cylindrical envelope surface 15 (see FIGS. 7 and 8), from which the cam 12 has a certain radial extension. The segments are mounted on a common drive shaft 2 (see again FIG. 1), and the hub part 11 includes a middle, through opening 16 of a cylindrical shape. Adjacent to said middle opening 16, a groove 17 is formed, in which the aforementioned lock wedge 7 of the drive shaft 2 can engage. The two end surfaces 13, 14 extend in planes, which are perpendicular to a centre axis C3 that coincides with the centre axis C1 of the assembled tool. In other words, the end surfaces 13, 14 are mutually parallel. The envelope surface 15 is concentric with the axis C3.

Figure 6:
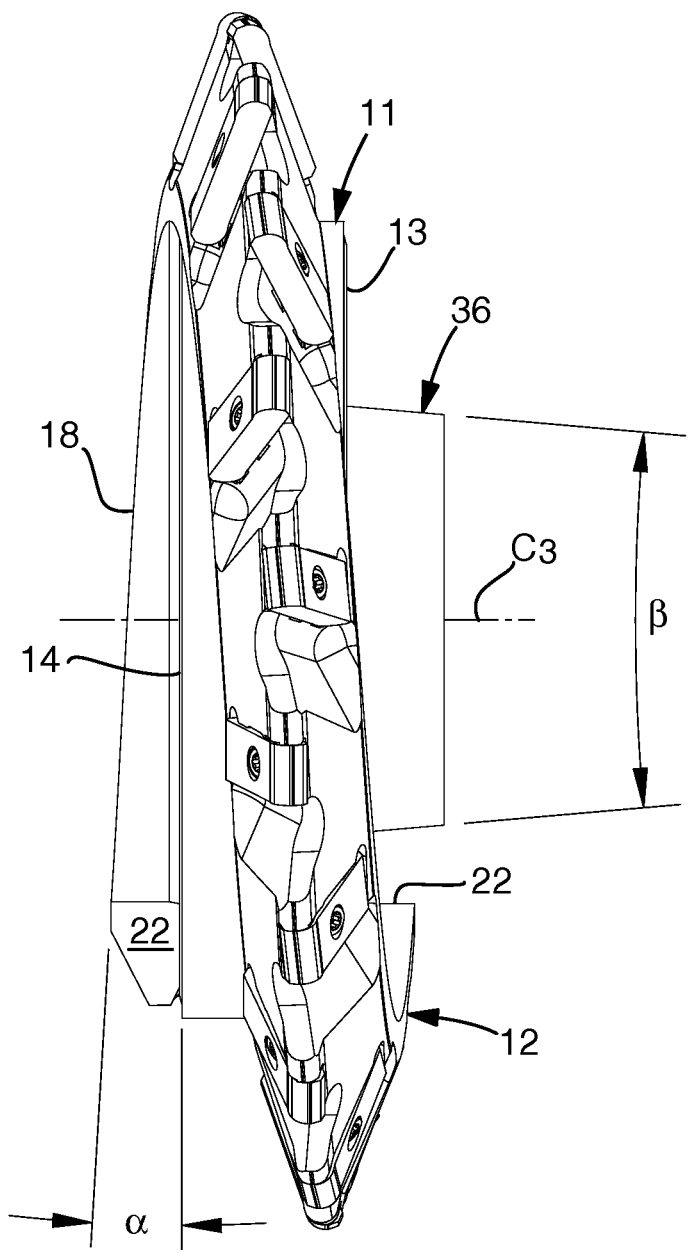
FIG. 6 is a side view of the segment.

The peripheral cam 12 extends one turn along the hub part 11 and follows a helical line of a predetermined pitch. This pitch is indicated by the angle α between the plane end surface 13 of the hub part and a ring-shaped front surface 18 of the cam 12 (see FIG. 6). The angle α is suitably within the range of 1-10°. The cam 12 is wedge-shaped in cross-section in such a way that it tapers from a wide base toward a pointed outer portion. In the opposite, inclined flank surfaces of the cam, a plurality of seats 19 (see FIG. 4) for replaceable milling inserts 20 are recessed. The seats are separated tangentially, or in other words, in the circumferential direction. Rotationally in front of each seat and milling insert, there is a chip channel 21 to facilitate the evacuation of the chips that are removed by means of the milling inserts. Every second seat and milling insert, respectively, are found in one flank surface of the cam and every second in the other flank surface. It should also be mentioned that the cam 12 ends in plane surfaces 22 (see FIGS. 6 and 7), which can be pressed against analogous surfaces of the cams in adjacent segments. Together, the cams of the individual segments thus form a continuous, thread-like screw formation of the assembled tool.

When the segments are assembled into a usable tool, the opposite end surfaces 13, 14 are suitably pressed into close contact with the opposite end surfaces of adjacent segments.

Figure 7:
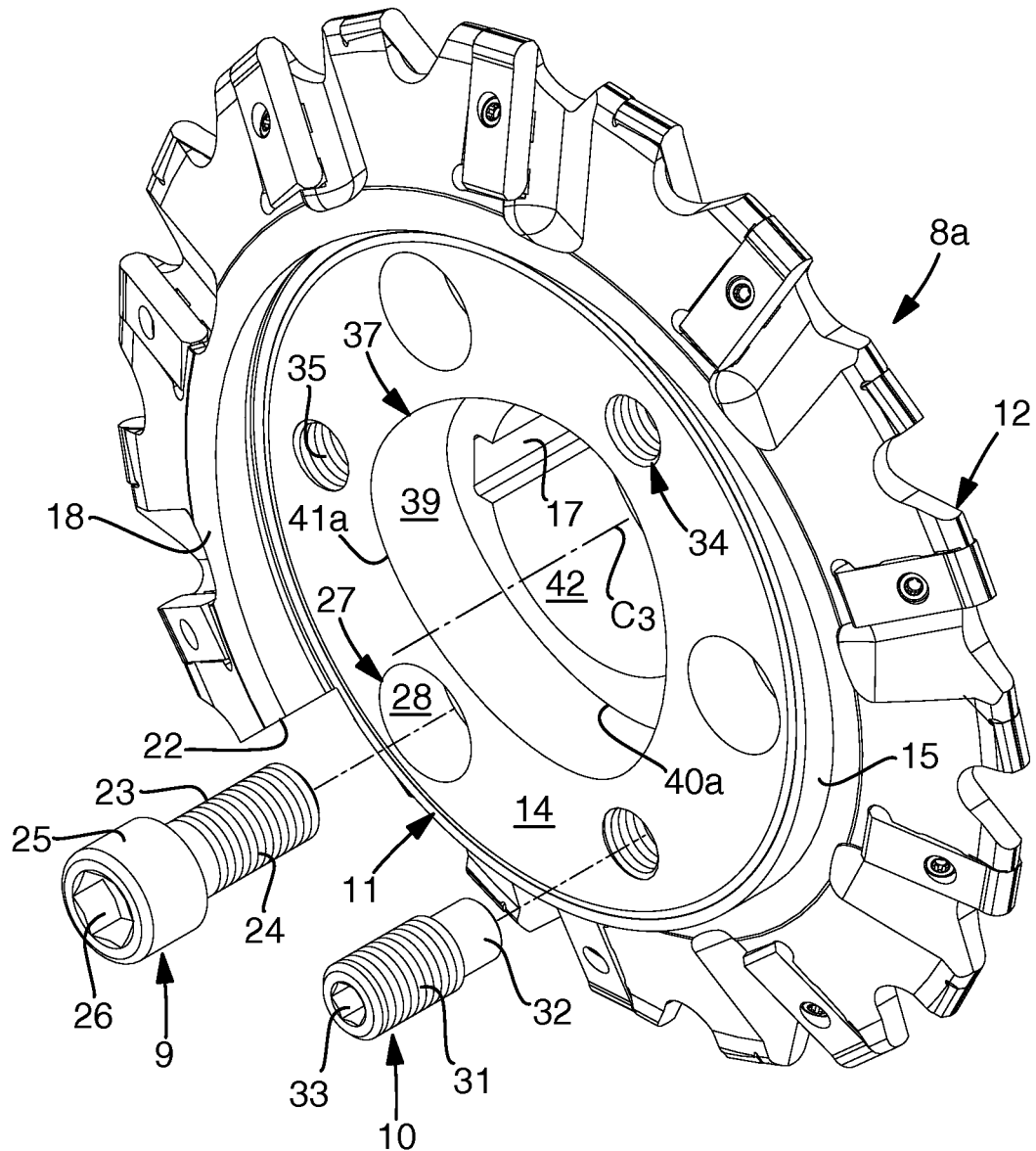
FIG. 7 is a perspective view showing the segment from the front together with a draw-in bolt as well as a dismounting screw.
Figure 8:
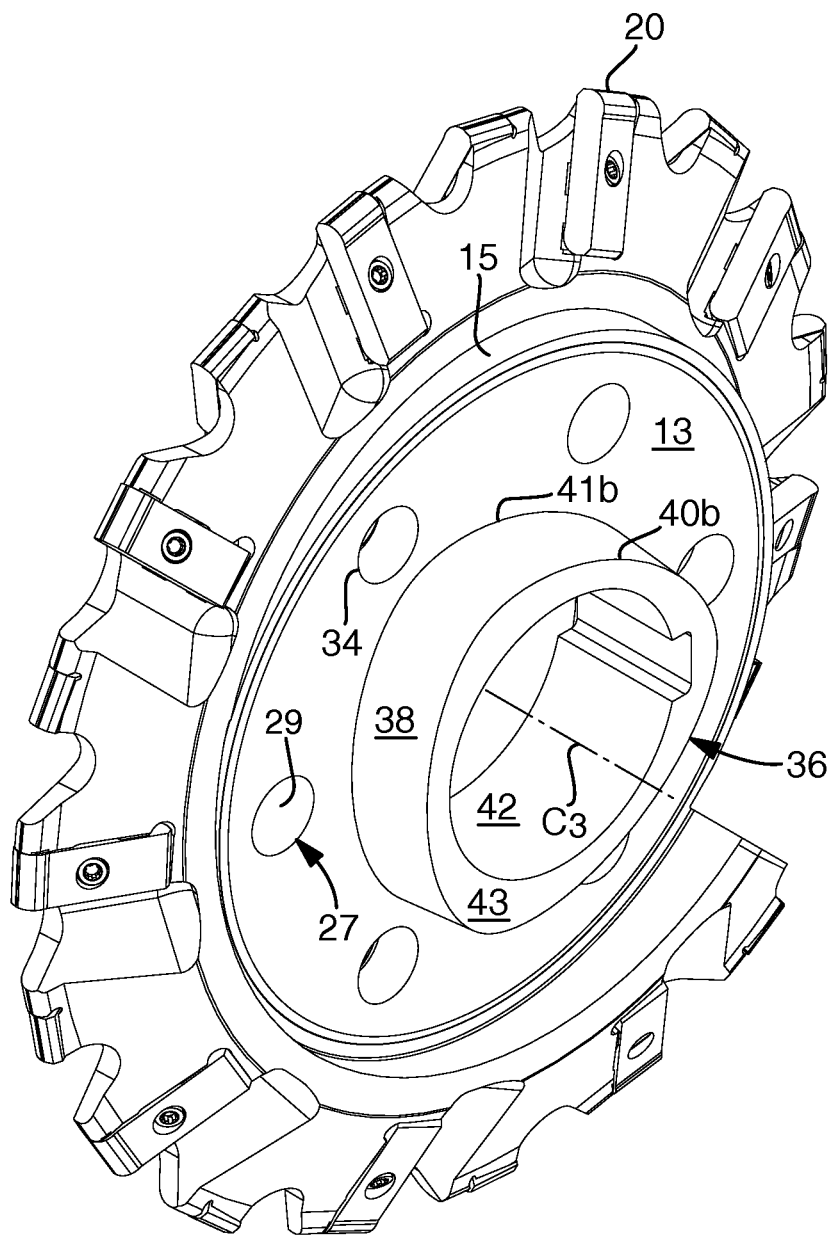
FIG. 8 is a perspective view from behind of the same segment.

For this purpose, in the shown, preferred embodiment, a plurality of draw-in bolts 9 are used, which most clearly are illustrated in FIG. 7. Each such screw includes a shank 23 having a male thread 24 as well as a head 25 having a greater diameter than the shank. In this head, a key grip 26 is formed for, for instance, a hex head wrench.

For each segment, three draw-in bolts 9 are advantageously used, which are applicable in through holes or bores 27 in the hub part 11. These bores are smooth so far that they are lacking threads. Each bore is formed with a countersink 28 that is intended for the screw head 25 and has an enlarged diameter. More precisely, the wide countersink 28 mouths in the front end surface 14 of the hub part, while a narrower section 29 (see FIGS. 5 and 8) mouths in the rear end surface 13 of the hub part. By the fact that the front and rear sections of the bore 27 have different diameters, a ring-shaped shoulder 30 is formed, against which the screw head 25 can be pressed. The three bores 27 are equidistantly separated, i.e., have an angular pitch of 120°.

The dismounting screw 10 (see FIG. 7) lacks head and includes a front male thread 31 as well as a rear cylindrical portion 32, the diameter of which is smaller than the outer diameter of the male thread. More precisely, the cylinder portion 32 has such a small diameter that the same can be introduced into the key grip 26 of a draw-in bolt 9. It should also be noted that the dismounting screw 10 includes a key grip 33 in its front end.

Axially through the hub part 11, three additional holes 34 extend, which, in contrast to the smooth bores 27, include a thread in the form of a female thread 35 (see FIG. 7). The male threads 23, 31 of the respective screws 9, 10 are similar, so that they individually can be secured in the holes 34 (however not simultaneously). Also the three threaded holes 34 are mutually equidistantly separated, i.e., have an angular pitch of 120°. Furthermore, the holes 34 are located halfway between two adjacent bores 27, implying that the angular pitch between each individual bore 27 and two adjacent, threaded holes 34 amounts to 60°.

Thanks to the spatial locations of the segments being determined by the male and female members in combination with the plane-parallel end surfaces, the tolerances of the smooth bores and the threaded holes are high. Their alignment with each other is not critical to the mutual location of the segments. A purpose of the screws 9 is to press together the set of segments 8 so that male and female members are brought together until opposite end surfaces 13, 14 are pressed in pairs into close contact with each other. Thus, the screws 9 remain in the assembled tool. The compressing force of the screws advantageously makes the connection between the individual segments extra stiff.

In other embodiments, the screws can be unscrewed again after the segments of the set having reached their respective end positions. It is also possible to press together the segments in another way than by means of screws, for example by means of an outer clamp or the like.

In the described embodiment, the dismounting screws 10 are not included in the assembled tool, but will not be of use until in connection with possible dismounting of the tool, when one or more segments are to be separated from each other.

In an illustrated embodiment, the segments are rotationally secured in relation to each other by means of connection means in the form of male and female members 36, 37 (see FIGS. 7 and 8) co-operating in pairs, which are integrated with the individual segments. Each male and female member includes a contact surface 38 and 39, respectively, which has an out-of-round cross-sectional shape as viewed in a plane perpendicular to the centre axis C3. Furthermore, the contact surface converges from a big end toward a small end. In the example, each segment includes, on one hand, a male member 36 that projects axially from the rear end surface 13 of the segment, and on the other hand a female member in the form of a recess 37 that mouths in the front end surface 14 of the hub part 11. In FIG. 7, the small end of the female member is represented by an endless boundary line 40a and the big end by a likewise endless boundary line 41a. In an analogous way, the boundary line 41b (see FIG. 8) represents the big end of the male member 36, while the small end is represented by the boundary line 40b. In other words, the contact surfaces 38, 39 converge in one and the same direction, viz. in the backward direction. The male member 36 is hollow or tubular (to allow leading through of the shaft 2) and includes an internal surface 42 that is cylindrical. The cylinder surface 42 and the external contact surface 38 connect to a common ring surface 43, which forms the free end of the male member 36.

In the example shown, the male and female members are situated centred on the centre axis C3. However, in other embodiments, it is possible to arrange the male and female members so that the centre axis C3, which normally is the same as the rotation axis C1 of the tool, extends through the male and female member displaced in some direction. The central location around the centre axis of the male and female members gives advantageously a simpler design of the geometries of the male and female members. The centred location also enables smaller male and female members, which advantageously implies stiffer segments.

Figure 15:
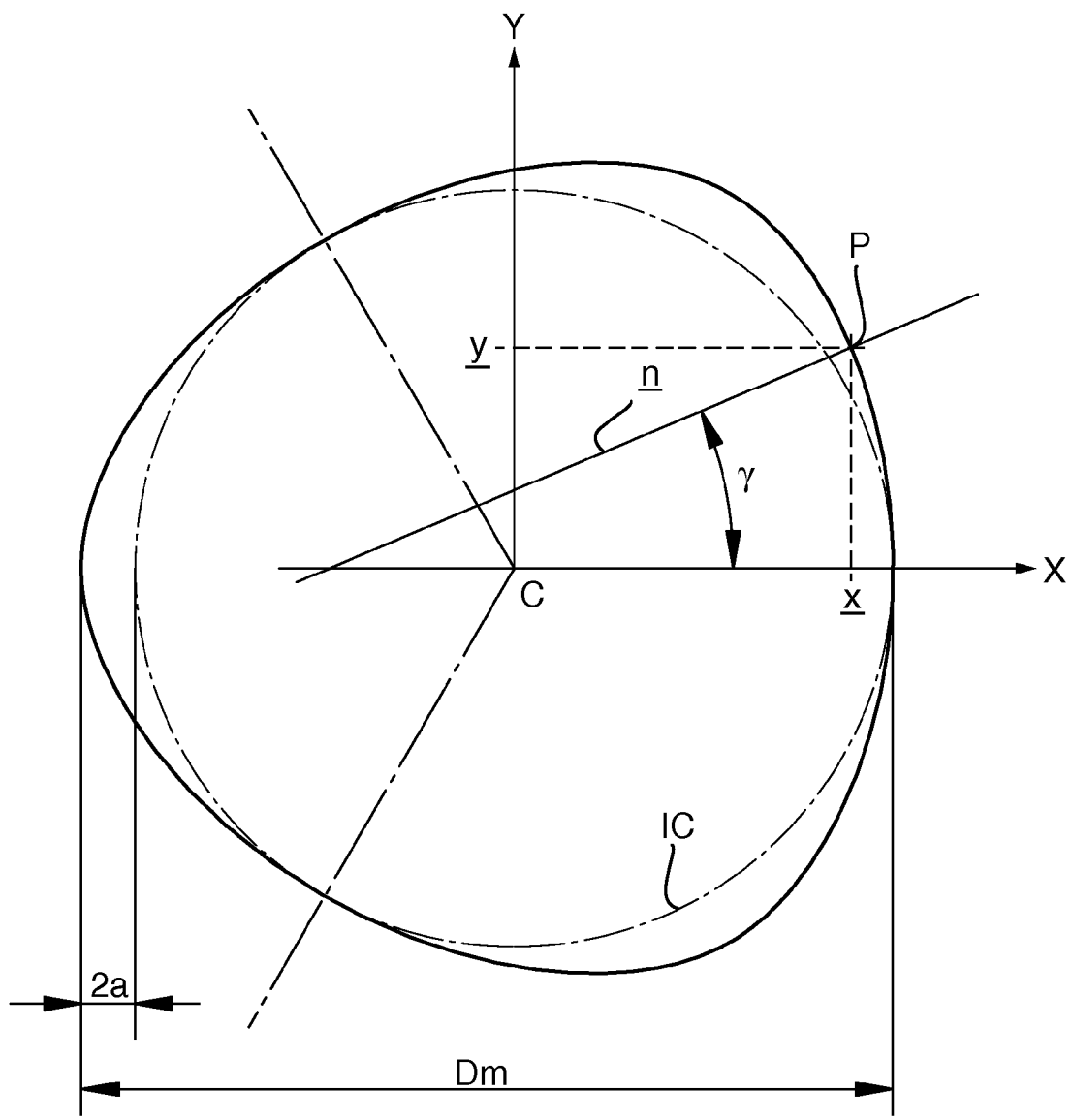
FIG. 15 is a geometrical picture illustrating a cross-sectional shape of an embodiment of the co-operating male and female members of the tool.

In the example, the out-of-round cross-sectional shape of the male and female members has been realized by the same having been made polygonal, more precisely trigonal or three-cornered. In brief terms, the shape is determined by a curve having three round corners, which protrude from an inscribed circle that is tangent to three curved arc lines having greater radius of curvature than the radius of curvature of the corners (see FIG. 15).

Geometrically, this curve is defined by the formulae:

$$x = \left(\frac{D_m}{2}\right) \cdot \cos(\gamma) - 2 \cdot a \cdot \cos(2\gamma) + a \cdot \cos(4\gamma)$$

$$y = \left(\frac{D_m}{2}\right) \cdot \sin(\gamma) + 2 \cdot a \cdot \sin(2\gamma) + a \cdot \sin(4\gamma)$$

wherein:
n=a normal to the curve in an arbitrary point P,
x and y=co-ordinates of a traditional system of co-ordinates,
γ=the angle between the normal n and the x-axis of the system of co-ordinates,
2a=the selected eccentricity (or bulging) of an individual corner in relation to the inscribed circle IC, and
$D_m$=the sum of the diameter of the inscribed circle and the eccentricity 2a.

Male and female-shaped couplings having said trigonal cross-sectional shape are per se previously known and used in tools for cutting machining. In commercial use, the couplings in question are denominated COROMANT CAPTO® and are often included in tools from SANDVIK COROMANT AB.

The angle of convergence β (see FIG. 6) of the two contact surfaces 38,39 should amount to at least 2° and at most 20° (β/2=1° and 10°, respectively). Suitably, the angle of convergence is within the range of 6-14°. In the example shown, arbitrary generatrices along the respective contact surface are straight. When the angles of convergence are moderate (by being within the above-mentioned interval), the engagement between the male and female members becomes self-locking so far that the members only by great difficulty (=great force) can be separated. On the other hand, too great angles of convergence outside the interval make more difficult the inventive desired guidance toward the spatially determined end position.

In the embodiment shown, the contact surfaces 38, 39 of the male and female members are finished into a very high dimensional accuracy, more precisely a dimensional accuracy that suitably is finer than 0.01 mm. This may advantageously be effected by so-called adaptive-controlled machining, preferably in the form of milling by means of a shank-end mill. Such machining is made in several consecutive steps after the workpiece having been formed with a material allowance of approx. 0.3 mm. After a first reduction of said material allowance, a measuring is made of the tolerances before further material is removed in at least one further step. In this way, the contact surfaces can all-round be given a dimensional accuracy of all the way down to 0.001 mm.

Figure 11:
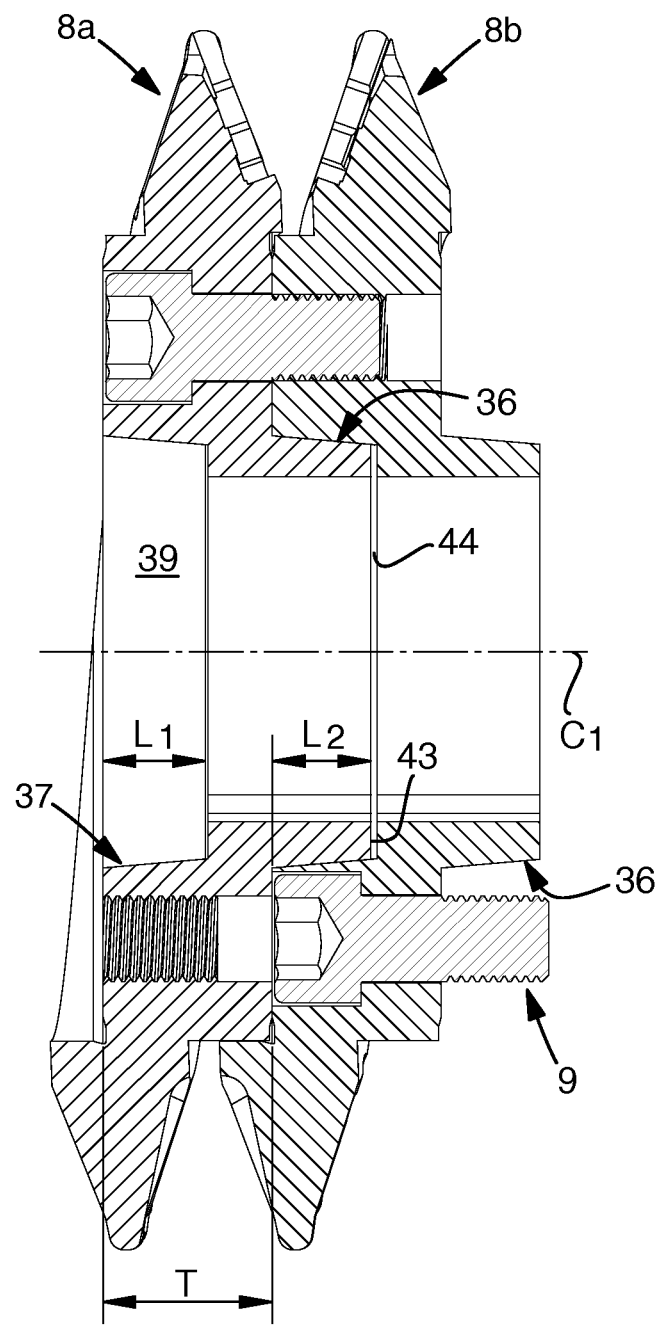
FIG. 11 is a longitudinal section through two segments connected to each other according to previous figures.

In FIG. 11, T designates the thickness of the individual segment, which is determined by the axial distance between the end surfaces 13 and 14. This measure coincides moreover with the pitch of the cam 12. The depth of the recess 37 is designated L1, while the axial length of the male member 36 is designated L2. L1 should amount to at least 30% and at most 80% of T. Preferably, L1 is within the interval of 50-70% of T. L1 is smaller than L2. When the male member 36 engages the appurtenant recess in the assembled state of the tool, there is a gap 44 between the free end 43 of the male member and the bottom of the recess. In other words, the male member does not touch the bottom in the recess. In this way, it is advantageously guaranteed that the desired axial end position, in which the plane-parallel surfaces of two bordering segments abut against each other, is reached without being obstructed by the male and female members.

Figure 9:
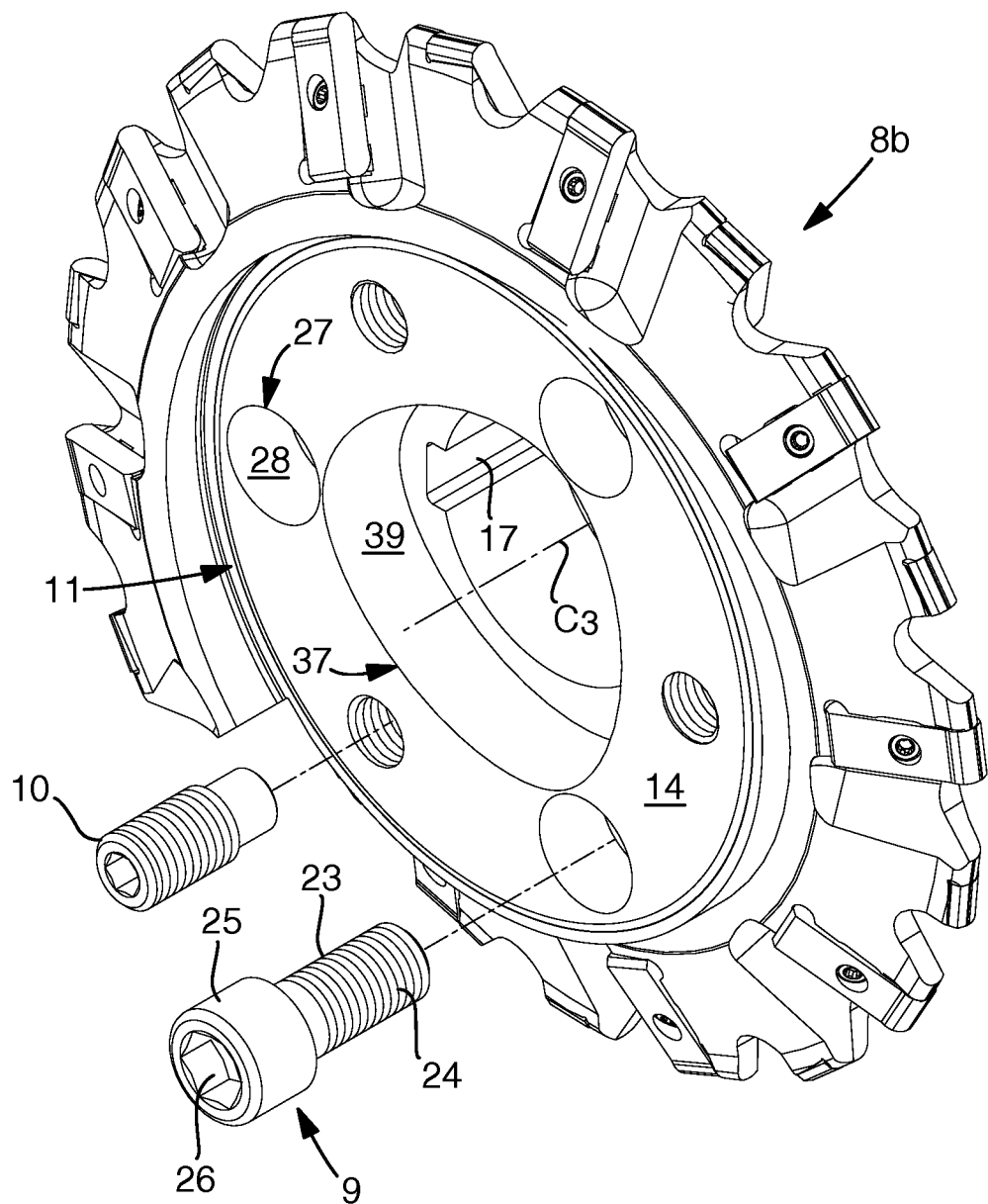
FIG. 9 is a perspective view corresponding to FIG. 7 of another type of segments included in an embodiment of the tool, which segments are alternately inserted between the segments of the first type.
Figure 10:
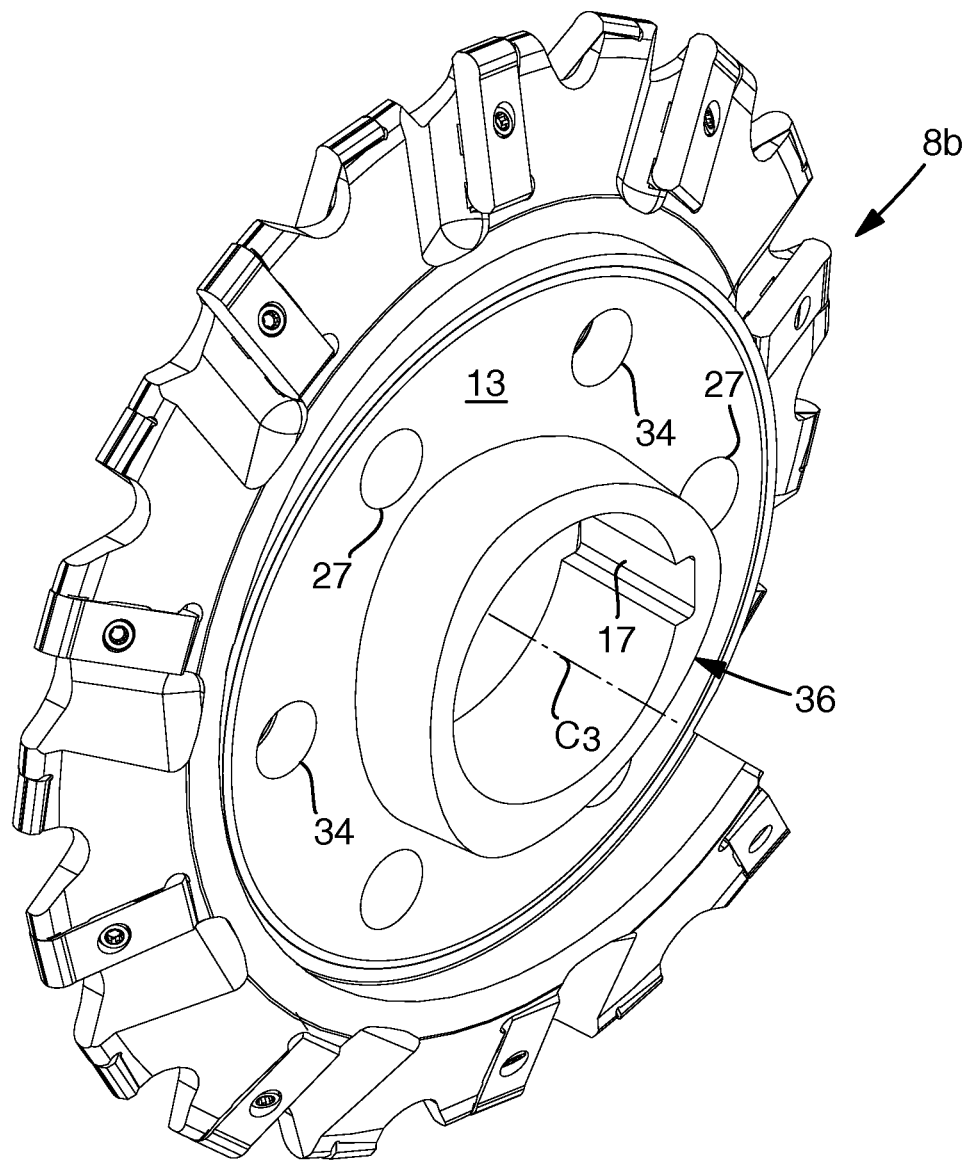
FIG. 10 is a perspective view from behind of the segment according to FIG. 9.

A difference between the two types of segments 8a and 8b is that the hole patterns of the respective segment types are turned 60° in relation to each other. This is seen in a comparison between FIG. 7 and FIG. 9. Thus, in the segment 8a according to FIG. 7, a threaded hole 35 is located in approximately the same angle position as the groove 17. In the segment 8b according to FIG. 9, however, a bore 27 is situated radially outside the groove 17.

In FIG. 3, it is seen that the rear end piece 5 includes three threaded holes 34, but no smooth bores. Furthermore, the end piece 5 includes a female-forming recess 37, but no male member. Like the segments, the end piece 5 includes, however, an axial groove 17.

In the front end piece, a rearward pointing male member (hidden in FIG. 3) is included as well as six holes in total, viz. three threaded holes 34 and three smooth bores 27 of the same type as in the segments 8a, 8b.

Mounting of the different components into an assembled tool may be made in the following way: In a first step, the male member 36 on a segment 8b is brought into engagement with the female member 37 in the rear end piece 5, besides which three head-provided screws 9 are tightened in the threaded holes 34. In such a way, the segment 8b can be pressed by great force against the end piece 5, so that the rear end surface 13 thereof is pressed into close contact with the front surface of the end piece 5. In the next step, the male member 36 on a segment of the type 8a is brought into engagement with the forward opening female member 37 in the already mounted segment 8b, after which the segments are pressed into close contact with each other by means of three additional screws 9. Next, this procedure is repeated until the desired number of segments has been connected with each other. In a concluding step, three screws 9 are brought to fix the front end piece 6 against the front segment 8a.

In the assembled state of the tool according to FIG. 2, the different segments together form a cylindrical body of a very high stiffness, implying that the spatial locations of the different milling inserts will be determined very accurately. The result of this will be that the flank surfaces of those cogs that are to be created in the workpiece W obtain very good tolerances.

Possible dismounting of the tool, for instance with the purpose of replacing a damaged segment, can be effected by means of the dismounting screws 10. When these are screwed into the threaded holes 34 of the front end piece 6, they will be pressed against the draw-in bolts 9 in the front segment 8a. More precisely, the cylinder portion 32 of the individual screw will be pressed against the bottom in the key grip 26 of the screw head. By tightening the three screws 10 approximately uniformly, it is guaranteed that the male member of the end piece 6 is reliably removed exactly axially out of the female member in the segment 8a. In further steps, the different segments can be separated from each other in the same way by means of three simultaneously active dismounting screws 10.

The segments are suitably manufactured from steel (which has a certain inherent elasticity), while the replaceable milling inserts in the traditional way are manufactured from a harder and more hard-wearing material, such as cemented carbide. However, it is also possible to use solid segments where the cutting edges are of the same piece of material as the segment.

According to one embodiment, in the manufacture of the segments, the individual male member is given a diminutive, radial excess dimension in relation to the co-operating female member. The excess dimension may amount to the order of 0.01 to 0.03 mm; this is something that results in the end surfaces of adjacent segments facing each other initially are kept separated by a narrow gap (0.01-0.5 mm wide) as long as the draw-in bolts are only moderately tightened. However, the draw-in bolts will, as soon as they are finally tightened by a high torque, press the male member into the female member by an axial force, which is sufficiently high for the material of the male member as well as the surrounding hub part to yield, and guarantee that the end surfaces of the segments are pressed into close contact with each other. In this way, it is advantageously provided that the rotationally secured connection between the segments becomes exceptionally stiff and strong. The fact that the end surfaces of the segments are pressed into close contact with each other furthermore guarantees a very accurate axial positioning in the assembled tool body.

Figure 12:
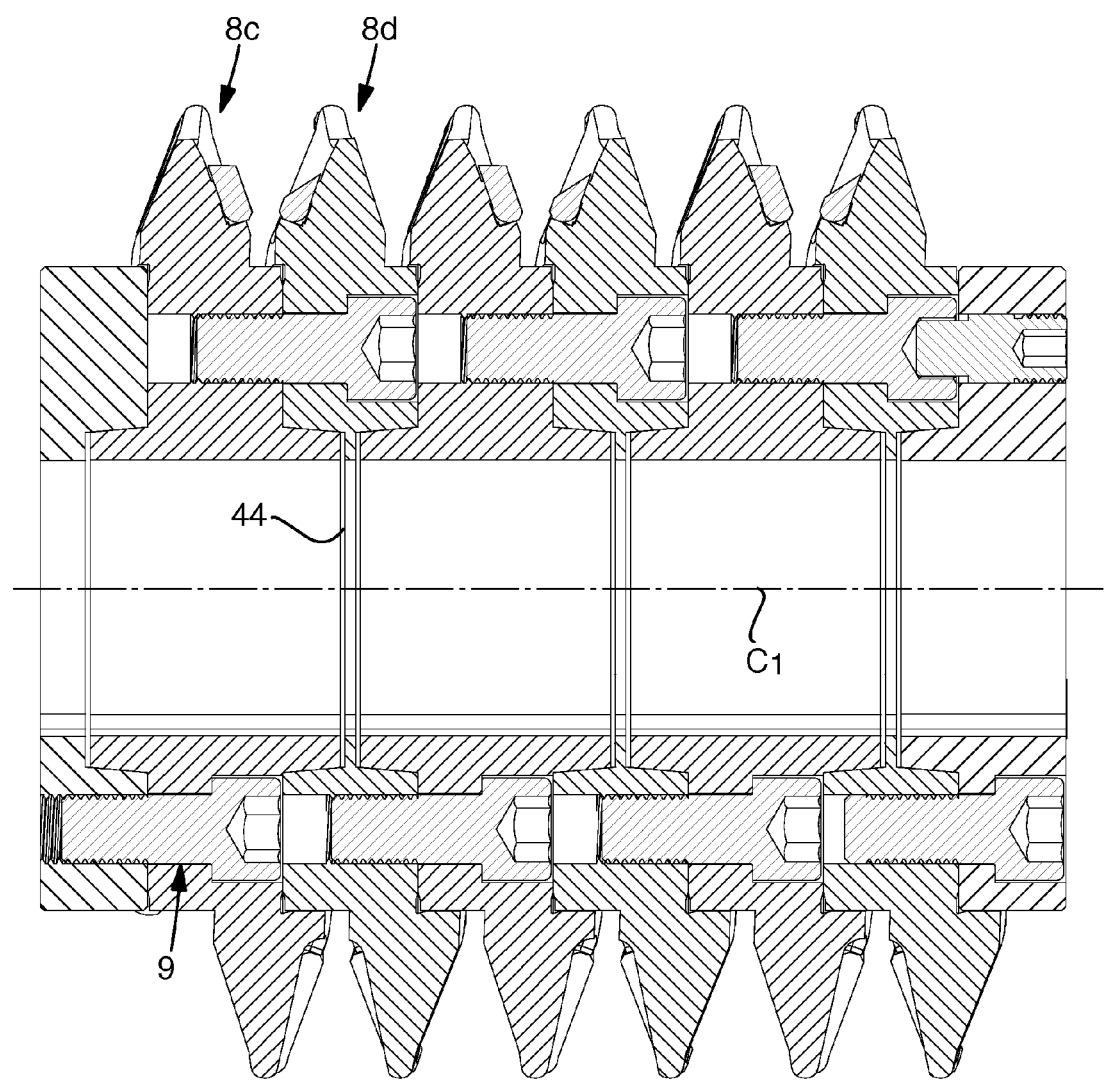
FIG. 12 is a longitudinal section through an alternative embodiment of the milling tool.
Figure 13:
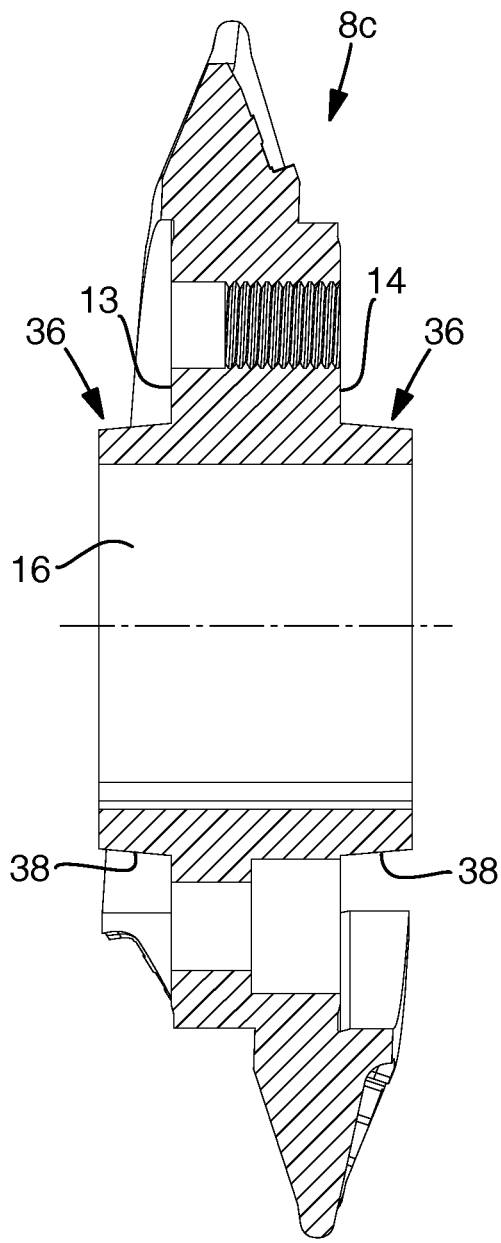
FIG. 13 is a longitudinal section through a segment formed with only male members and included in the tool according to FIG. 12.
Figure 14:
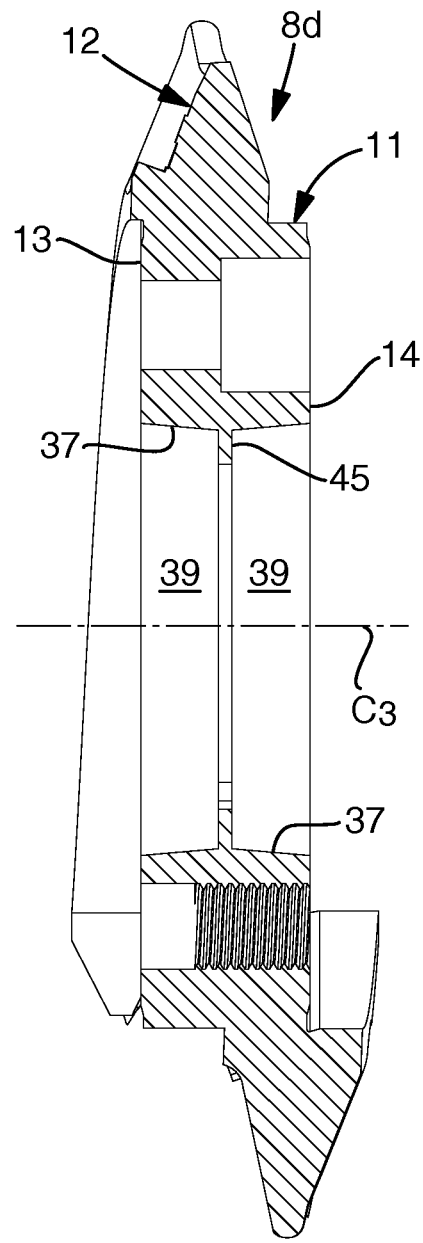
FIG. 14 is a longitudinal section through a segment formed with only female members and included in the tool according to FIG. 12.

In FIGS. 12-14, an alternative embodiment of the disclosed tool is shown. In this case, half of the segments included in the tool, viz. the segments 8c, are formed with two male members 36, which project from opposite end surfaces 13, 14 of the segments. The contact surfaces 38 of these male members converge in opposite directions, more precisely in such a way that the big ends of the contact surfaces are situated closest to the end surfaces 13, 14 and the small ends closest to the free ends of the male members.

The other type of segments 8d includes only female members 37 in the form of two recesses, which are separated by a ring-shaped flange 45. In analogy with the previously described embodiment, the contact surfaces of the male members as well as of the female members have an out-of-round, preferably trigonal, cross-sectional shape, in addition to they are converging between big ends and small ends. In other respects, the same kind of screws, which previously has been described, can be used to, on one hand, press together the segments into a stiff, tubular tool body, and on the other hand separate the segments upon a possible dismounting of the tool.

The invention is not only limited to the embodiments described above and shown in the drawings but may, within the scope of the accompanying claims, be modified in many different ways. Thus, it is possible to hold the different segments reliably compressed in another way than by means of screws. Because the described male and female members will be self-locking if the angles of convergence are within the described interval of 2-20°, the segments may be pressed together by means of outer press mechanisms, and then hold together without disintegrating.

In the embodiments shown, the assembled tool includes an even number of segments, viz. six. However, the number of segments may deviate upward as well as downward from this number. However, the tool should be composed of at least three segments and at most twelve. Also, the number of segments may be odd.

It should also be pointed out that the out-of-round cross-sectional shape of the male and female members not necessarily needs to be polygonal. Thus, the same may be elliptical or in another way deviate from circular shape.

The tool may comprise seats for milling inserts or be formed integrally with cutting edges.

Although the present invention has been described in connection with preferred embodiments thereof, it will be appreciated by those skilled in the art that additions, deletions, modifications, and substitutions not specifically described may be made without department from the spirit and scope of the invention as defined in the appended claims.

What is claimed is:

1. A milling tool formed for the hobbing of a workpiece having cogs comprising a cylindrical tool body that defines a rotation axis (C1, C3) and comprises a plurality of disc-shaped segments each one of which includes
    a hub part having two opposite plane-parallel end surfaces that extend perpendicular to the rotation axis (C1, C3), and
    a peripheral cam for a plurality of tangentially spaced-apart milling inserts,
    wherein bordering disc-shaped segments are detachably interconnected by means of one each of male and female members co-operating in pairs,
    wherein the male and female members are situated so that the rotation axis (C1, C3) extends through the male and female members, and
    wherein the male and female members include each a contact surface, which converges from a big end toward a small end and which, in a cross-section across the rotation axis, forms an out-of-round curve, the contact surfaces of the male and female members being dimensioned so that they, when the male and female members are being brought together, direct their two bordering segments toward an end position that is centred and mutually angularly determined by the out-of-round cross-section curve around the rotation axis (C1, C3) and where the plane-parallel end surfaces abut against each other.

2. Milling tool according to claim 1, wherein the contact surface of the male member has a radial excess dimension in relation to the contact surface of the female member, so that, in the assembled state of the tool, the contact surface of the female member abuts with pressure against the contact surface of the male member.

3. Milling tool according to claim 1, wherein, in the assembled state of the tool, there is a gap between the small end of the male member and the small end of the female member.

4. Milling tool according to claim 1, wherein the male and female members are integrated with their segments.

5. Milling tool according to claim 1, wherein the individual segment is formed with, on one hand, a male member that projects axially from an end surface, and, on the other hand, a recess that serves as a female member and mouths in the other end surface.

6. Milling tool according to claim 1, wherein the individual contact surface is finished into a dimensional accuracy that is finer than 0.01 mm.

7. Milling tool according to claim 1, wherein the individual contact surface has a trigonal cross-sectional shape, which is defined by the following formulae:

$$x = \left(\frac{D_m}{2}\right) \cdot \cos(\gamma) - 2 \cdot a \cdot \cos(2\gamma) + a \cdot \cos(4\gamma)$$

$$y = \left(\frac{D_m}{2}\right) \cdot \sin(\gamma) + 2 \cdot a \cdot \sin(2\gamma) + a \cdot \sin(4\gamma)$$

wherein:
- n=a normal to the curve in an arbitrary point P,
- x and y=co-ordinates of a traditional system of co-ordinates,
- γ=the angle between the normal n and the x-axis of the system of co-ordinates,
- 2a=the selected eccentricity (or bulging) of an individual corner in relation to the inscribed circle IC, and
- $D_m$=the sum of the diameter of the inscribed circle and the eccentricity 2a.

8. Milling tool according to claim 1, wherein pairs of adjacent segments are arranged axially compressed by means of a plurality of draw-in bolts, which include a head and a shank that is formed with a male thread and brought through a bore in one of the segments and tightened with its male thread in a threaded hole in the other segment.

9. Milling tool according to claim 8, wherein both the number of bores and the number of threaded holes in the individual segment amount to three, the bores as well as the threaded holes being equidistantly separated at an angular pitch of 120°, the angular pitch between each individual bore and two adjacent threaded holes amounting to 60°.

10. Milling tool according to claim 9, wherein the milling tool includes two different types of segments, which have their hole patterns displaced by 60° in relation to each other, and which are alternately placed between each other.

11. Milling tool according to claim 1, wherein the individual contact surface of the male and female members converges at an angle of convergence (β) that amounts to at least 2° and at most 20°.

12. Milling tool according to claim 1, wherein the segments are arranged along a common drive shaft and placed between two disc-shaped end pieces, which include male or female members co-operating with the first and the last segments.

13. Segment for a cylindrical tool body for a milling tool formed for the hobbing of a workpiece having cogs, which tool body comprises a plurality of detachably interconnected such segments, the segment being disc-shaped and comprising:
- a hub part having two opposite plane-parallel end surfaces that extend perpendicular to a rotation axis (C3); and
- a peripheral cam for a plurality of tangentially spaced-apart milling inserts,
- wherein the segment furthermore comprises a male or female member for the detachable interconnection with a bordering segment,
- wherein the male or female member is situated so that the rotation axis (C3) extends through the male or female member, and
- wherein the male or female member includes a contact surface, which converges from a big end toward a small end and which, in a cross-section across the rotation axis, forms an out-of-round curve.

14. Segment according to claim 13, wherein the male or female member is integrated with the segment.

15. Segment according to claim 13, wherein a male member projects axially from a first end surface, and a female member in the form of a recess mouths in the other end surface.

16. Segment according to claim 13, wherein the contact surface is finished into a dimensional accuracy that is finer than 0.01 mm.

17. Segment according to claim 13, wherein the contact surface has a trigonal cross-sectional shape, which is defined by the following formulae:

$$x = \left(\frac{D_m}{2}\right) \cdot \cos(\gamma) - 2 \cdot a \cdot \cos(2\gamma) + a \cdot \cos(4\gamma)$$

$$y = \left(\frac{D_m}{2}\right) \cdot \sin(\gamma) + 2 \cdot a \cdot \sin(2\gamma) + a \cdot \sin(4\gamma)$$

wherein:
- n=a normal to the curve in an arbitrary point P,
- x and y=co-ordinates of a traditional system of co-ordinates,
- γ=the angle between the normal n and the x-axis of the system of co-ordinates,
- 2a=the selected eccentricity (or bulging) of an individual corner in relation to the inscribed circle IC, and
- $D_m$=the sum of the diameter of the inscribed circle and the eccentricity 2a.

18. Segment according to claim 13, wherein the angle of convergence (β) of the contact surface amounts to at least 2° and at most 20°.

19. Segment according to claim 13, wherein the hub part includes, on one hand, a plurality of through, smooth bores, and, on the other hand, a plurality of through holes having female threads.

20. Segment according to claim 19, wherein the number of bores as well as the number of threaded holes amount to three, the bores being equidistantly separated at an angular pitch of 120° and the angular pitch between each individual bore and two adjacent, threaded holes amounting to 60°.

21. Segment according to claim 14, wherein a male member projects axially from a first end surface, and a female member in the form of a recess mouths in the other end surface.

22. Milling tool according to claim 2, wherein, in the assembled state of the tool, there is a gap between the small end of the male member and the small end of the female member.

* * * * *